(12) United States Patent
Alperovich et al.

(10) Patent No.: US 10,868,741 B2
(45) Date of Patent: Dec. 15, 2020

(54) ANCHOR SHORTENING ACROSS STREAMING NODES

(71) Applicant: Microsoft Technology Licensing, LLC, Redmond, WA (US)

(72) Inventors: Alexander Alperovich, Redmond, WA (US); Boris Shulman, Sammamish, WA (US); Lev Novik, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 15/977,916

(22) Filed: May 11, 2018

(65) Prior Publication Data

US 2018/0262408 A1 Sep. 13, 2018

Related U.S. Application Data

(63) Continuation-in-part of application No. 14/732,416, filed on Jun. 5, 2015, now Pat. No. 10,148,719.

(51) Int. Cl.
| | |
|---|---|
| *G06F 15/16* | (2006.01) |
| *H04L 12/26* | (2006.01) |
| *H04L 29/08* | (2006.01) |
| *H04L 29/06* | (2006.01) |
| *G06F 16/2455* | (2019.01) |
| *H04L 29/14* | (2006.01) |

(52) U.S. Cl.
CPC ........ *H04L 43/04* (2013.01); *G06F 16/24568* (2019.01); *H04L 65/60* (2013.01); *H04L 67/12* (2013.01); *H04L 69/40* (2013.01); *H04L 67/10* (2013.01)

(58) Field of Classification Search
CPC .... H04L 43/04; H04L 65/60; G06F 16/24568
USPC .................................... 709/203, 219
See application file for complete search history.

(56) References Cited

U.S. PATENT DOCUMENTS

| | | |
|---|---|---|
| 5,625,788 A | 4/1997 | Boggs et al. |
| 5,721,855 A | 2/1998 | Hinton et al. |
| 5,889,982 A | 3/1999 | Rodgers et al. |

(Continued)

FOREIGN PATENT DOCUMENTS

| | | |
|---|---|---|
| WO | 2014052917 A1 | 4/2014 |
| WO | 2015070232 A1 | 5/2015 |

OTHER PUBLICATIONS

"Samza", Retrieved from: http://samza.apache.org/learn/documentation/0.7.0/container/checkpointing.html, Retrieved on: Jun. 5, 2015, 4 Pages.

(Continued)

*Primary Examiner* — Duyen M Doan
(74) *Attorney, Agent, or Firm* — Ray Quinney & Nebeker, P.C.; Thomas M. Hardman; Timothy J. Chuma

(57) ABSTRACT

A method for facilitating anchor shortening across streaming nodes in an event stream processing system may include receiving a full anchor at an upstream marshaller. The full anchor may be associated with a data batch that corresponds to one or more event streams. The full anchor may include an indication of an input point for the one or more event streams. The full anchor may be received from an upstream compute processor. The method may also include mapping the full anchor to an index anchor and passing the index anchor to a downstream marshaller.

20 Claims, 9 Drawing Sheets

(56) References Cited

U.S. PATENT DOCUMENTS

| | | |
|---|---|---|
| 6,449,618 B1 | 9/2002 | Blott et al. |
| 6,516,310 B2 | 2/2003 | Paulley |
| 6,625,150 B1 | 9/2003 | Yu |
| 6,820,121 B1 | 11/2004 | Callis et al. |
| 7,010,538 B1 | 3/2006 | Black |
| 7,251,747 B1 | 7/2007 | Bean et al. |
| 7,603,488 B1 | 10/2009 | Gravenstein et al. |
| 7,680,830 B1 | 3/2010 | Ohr et al. |
| 7,738,380 B1 | 6/2010 | Dubrovsky et al. |
| 8,001,309 B2 | 8/2011 | Patzelt et al. |
| 8,219,848 B2 | 7/2012 | Branson et al. |
| 8,392,381 B2 | 3/2013 | Al-Kateb et al. |
| 8,417,690 B2 | 4/2013 | Poppe et al. |
| 8,797,867 B1 | 8/2014 | Chen et al. |
| 8,812,487 B2 | 8/2014 | Krishnamurthy et al. |
| 8,949,194 B1 | 2/2015 | Mehlum et al. |
| 8,949,801 B2 | 2/2015 | Andrade et al. |
| 2002/0010804 A1 | 1/2002 | Sanghvi et al. |
| 2002/0184159 A1 | 12/2002 | Tadayon et al. |
| 2004/0219925 A1 | 11/2004 | Ahya et al. |
| 2005/0281279 A1 | 12/2005 | Dennison et al. |
| 2006/0004597 A1 | 1/2006 | Charters et al. |
| 2006/0143170 A1 | 6/2006 | Ganguly et al. |
| 2006/0195309 A1 | 8/2006 | Stokkan et al. |
| 2007/0136279 A1* | 6/2007 | Zhou .................. G06F 16/9566 |
| 2008/0005391 A1 | 1/2008 | Gedik et al. |
| 2008/0162666 A1* | 7/2008 | Ebihara .................. H04L 67/14 709/217 |
| 2008/0270640 A1 | 10/2008 | Gedik et al. |
| 2009/0063548 A1 | 3/2009 | Rusher et al. |
| 2009/0157895 A1 | 6/2009 | Van Den Berghe |
| 2010/0254462 A1 | 10/2010 | Friedrich et al. |
| 2011/0063303 A1 | 3/2011 | Choi et al. |
| 2011/0066746 A1 | 3/2011 | Bennett et al. |
| 2012/0005564 A1 | 1/2012 | Tsubaki |
| 2013/0132978 A1 | 5/2013 | Opher et al. |
| 2013/0166617 A1 | 6/2013 | Branson et al. |
| 2014/0016501 A1 | 1/2014 | Kamath et al. |
| 2014/0201225 A1 | 7/2014 | Deshmukh et al. |
| 2014/0215184 A1 | 7/2014 | Branson et al. |
| 2014/0226469 A1 | 8/2014 | Stewart |
| 2015/0134796 A1 | 5/2015 | Theimer et al. |
| 2016/0359940 A1 | 12/2016 | Chen et al. |
| 2018/0124141 A1* | 5/2018 | Lewis .................. H04L 67/42 |

OTHER PUBLICATIONS

"SAS Event Stream Processing Engine", Retrieved from: https://web.archive.org/web/20141112213217/http://www.sas.com/content/dam/SAS/en_us/doc/factsheet/event-stream-processing-engine-106151.pdf, Nov. 12, 2014, 4 Pages.

"Non Final Office Action Issued in U.S. Appl. No. 14/732,374", dated Jan. 12, 2017, 8 Pages.

"Final Office Action Issued in U.S. Appl. No. 14/732,398", dated Jul. 7, 2017, 37 Pages.

"Non Final Office Action Issued in U.S. Appl. No. 14/732,398", dated Jan. 25, 2017, 31 Pages.

"Final Office Action Issued in U.S. Appl. No. 14/732,416", dated Oct. 19, 2017, 10 Pages.

"Non Final Office Action Issued in U.S. Appl. No. 14/732,416", dated Apr. 7, 2017, 9 Pages.

Akidau, et al., "MillWheel: Fault-tolerant Stream Processing at Internet Scale", In Proceedings of the VLDB Endowment, vol. 6, Issue 11, Aug. 26, 2013, 12 Pages.

Ananthanarayanan, et al., "Photon: Fault-tolerant and Scalable Joining of Continuous Data Streams", In Proceedings of the 2013 ACM SIGMOD International Conference on Management of Data, Jun. 22, 2013, pp. 577-588.

Asha, et al., "Adaptive Join Operators for Result Rate Optimization on Streaming Inputs", In Proceedings of International Journal of Engineering Trends and Technology, May 2011, pp. 73-77.

Babu, et al., "Exploiting K-Constraints to Reduce Memory Overhead in Continuous Queries Over Data Streams", In Journal of ACM Transactions on Database Systems (TODS), vol. 29, Issue 3, Sep. 2004, pp. 545-580.

Bockermann, Christian, "A Survey of the Stream Processing Landscape", In Technical Report, May 16, 2014, 47 Pages.

Branson, et al., "CLASP: Collaborating, Autonomous Stream Processing Systems", In Proveedings of ACM/IFIP/USENIX 8th International Middleware Conference, Nov. 26, 2007, pp. 348-367.

Brito, et al., "Scalable and Low-Latency Data Processing with Stream MapReduce", In Proceedings of IEEE Third International Conference on Cloud Computing Technology and Science, Nov. 29, 2011, pp. 48-58.

Das, et al., "Approximate Join Processing Over Data Streams", In the Proceedings of the ACM SIGMOD international conference on Management of Data, Jun. 9, 2003, 12 Pages.

Dash, et al., "Delivering QOS in Xml Data Stream Processing Using Load Shedding", In Proceedings of International Journal of Database Management Systems, vol. 4, Issue No. 3, Jun. 2012, pp. 49-71.

Ding, et al., "MJoin: A Metadata Aware Stream Join Operator", In Proceedings of the 2nd International Workshop on Distributed Event-Based Systems, Jun. 8, 2003, 8 Pages.

Francisci Morales, Gianmarco DE., "Distributed Stream Processing Showdown: S4 vs Storm", Retrieved from: https://gdfm.me/2013/01/02/distributed-stream-processing-showdown-s4-vs-storm/, Jan. 2, 2013, 5 Pages.

Gedik, et al., "GrubJoin: An Adaptive, Multi-Way, Windowed Stream Join with Time Correlation-Aware CPU Load Shedding", In the Proceedings of IEEE Transactions on Knowledge and Data Engineering, vol. 19, Issue 10, Oct. 2, 2007, pp. 1363-1380.

Gu, et al., "Adaptive Load Diffusion for Stream Joins", In Proceedings of the ACM/IFIP/USENIX 6th International Conference on Middleware, Nov. 28, 2005, 10 Pages.

Heinze, et al., "Latency-Aware Elastic Scaling for Distributed Data Stream Processing Systems", In Proceedings of the 8th ACM International Conference on Distributed Event-Based Systems, May 26, 2014, pp. 13-22.

Hu, et al., "ELF: Efficient Lightweight Fast Stream Processing at Scale", In Proceedings of USENIX ATC Annual Technical Conference, Jun. 19, 2014, pp. 25-36.

Hwang, et al., "A Comparison of Stream-Oriented High-Availability Algorithms", In Technical Report, Jun. 5, 2003., 13 Pages.

Hwang, et al., "High-Availability Algorithms for Distributed Stream Processing", In Proceedings of the 21st International Conference on Data Engineering, Apr. 5, 2005, 12 Pages.

Kamburugamuve, Supun, "Survey of Distributed Stream Processing for Large Stream Sources", In Technical Report, Dec. 14, 2013, 16 Pages.

Keckler, et al., "Concurrent Event Handling Through Multithreading", In Proceedings of IEEE Transactions on computers, vol. 48, Issue 9, Sep. 1999, pp. 903-916.

Li, et al., "Event stream processing with out-of-order data arrival", In the Proceedings of 27th International Conference on Distributed Computing Systems Workshops, Jun. 22, 2007, 8 Pages.

Liu, et al., "SAND: A Fault-Tolerant Streaming Architecture for Network Traffic Analytics", In Proceedings of the 44th Annual IEEE/IFIP International Conference on Dependable Systems and Networks, Jun. 23, 2014, pp. 80-87.

Mumian, et al., "Introduction to Azure Stream Analytics", Retrieved from: https://docs.microsoft.com/en-us/azure/stream-analytics/stream-analytics-introduction, Mar. 21, 2015, 2 Pages.

"International Preliminary Report on Patentability Issued in PCT Application No. PCT/US2016/035610", dated May 29, 2017, 7 Pages.

"International Search Report and Written Opinion Issued in PCT Application No. PCT/US2016/035610", dated Sep. 5, 2016, 13 Pages.

"International Search Report and Written Opinion Issued in PCT Application No. PCT/US2016/035611", dated Sep. 14, 2016, 15 Pages.

(56) References Cited

OTHER PUBLICATIONS

Battler, et al., "Towards Elastic Stream Processing: Patterns and Infrastructure", In Proceedings of the First International Workshop on Big Dynamic Distributed Data, Aug. 30, 2013, pp. 49-54.
Srivastava, et al., "Memory-Limited Execution of Windowed Stream Joins", In the Proceedings of the International Conference on Very Large Databases, vol. 30, Aug. 31, 2004, pp. 324-335.
Stokes, Jeff, "Azure Stream Analytics Developer Guide", Retrieved from: https://web.archive.org/web/20151001104415/https://azure.microsoft.com/en-in/documentation/articles/stream-analytics-introduction/, Retrieved Date: Apr. 8, 2015., 9 Pages.
Xie, et al., "A Survey of Join Processing in Data Streams.", In the proceedings of Springer Data Streams, vol. 31, Apr. 2, 2007, 28 Pages.
"Notice of Allowance Issued in U.S. Appl. No. 14/732,416", dated May 21, 2018, 9 Pages.
"International Search Report and Written Opinion Issued in PCT Application No. PCT/US2019/030505", dated Jul. 3, 2019, 11 Pages.

\* cited by examiner

ANCHOR SHORTENING ACROSS STREAMING NODES

PRIORITY CLAIM

This application is a continuation-in-part of U.S. patent application Ser. No. 14/732,416, titled "Using Anchors for Reliable Stream Processing," filed on Jun. 5, 2015, with inventors Zhong Chen, Lev Novik, Boris Shulman, and Clemens A. Szyperski, the contents of which are hereby incorporated by reference as if fully set forth herein.

BACKGROUND

Event stream processing refers to the process of quickly analyzing time-based data, such as time series data. In the context of event stream processing, the term "event" refers to any occurrence that happens at a defined time and can be recorded using one or more data fields. An "event stream" is a sequence of multiple data events, which may be ordered by time. Some examples of different types of event streams include Internet of Things (IoT) data (e.g., sensor data, signals from control systems, location information), business transactions (e.g., customer orders, bank deposits, invoices), and information reports (e.g., social media updates, market data, weather reports).

With traditional approaches, data is typically processed after it has been stored. Advantageously, event stream processing allows data to be analyzed as it is being created and before it is stored. For example, data may be analyzed when it is streaming from one device to another. This allows for faster reaction time and may even provide an opportunity for proactive measures to be taken.

Event stream processing may be utilized to identify meaningful patterns or relationships within event streams in order to detect relationships like event correlation, causality, or timing. There are a wide variety of industries that can benefit from event stream processing, including network monitoring, cybersecurity, retail optimization, surveillance, fraud detection, financial trading, and e-commerce.

DETAILED DESCRIPTION

Figure 1:
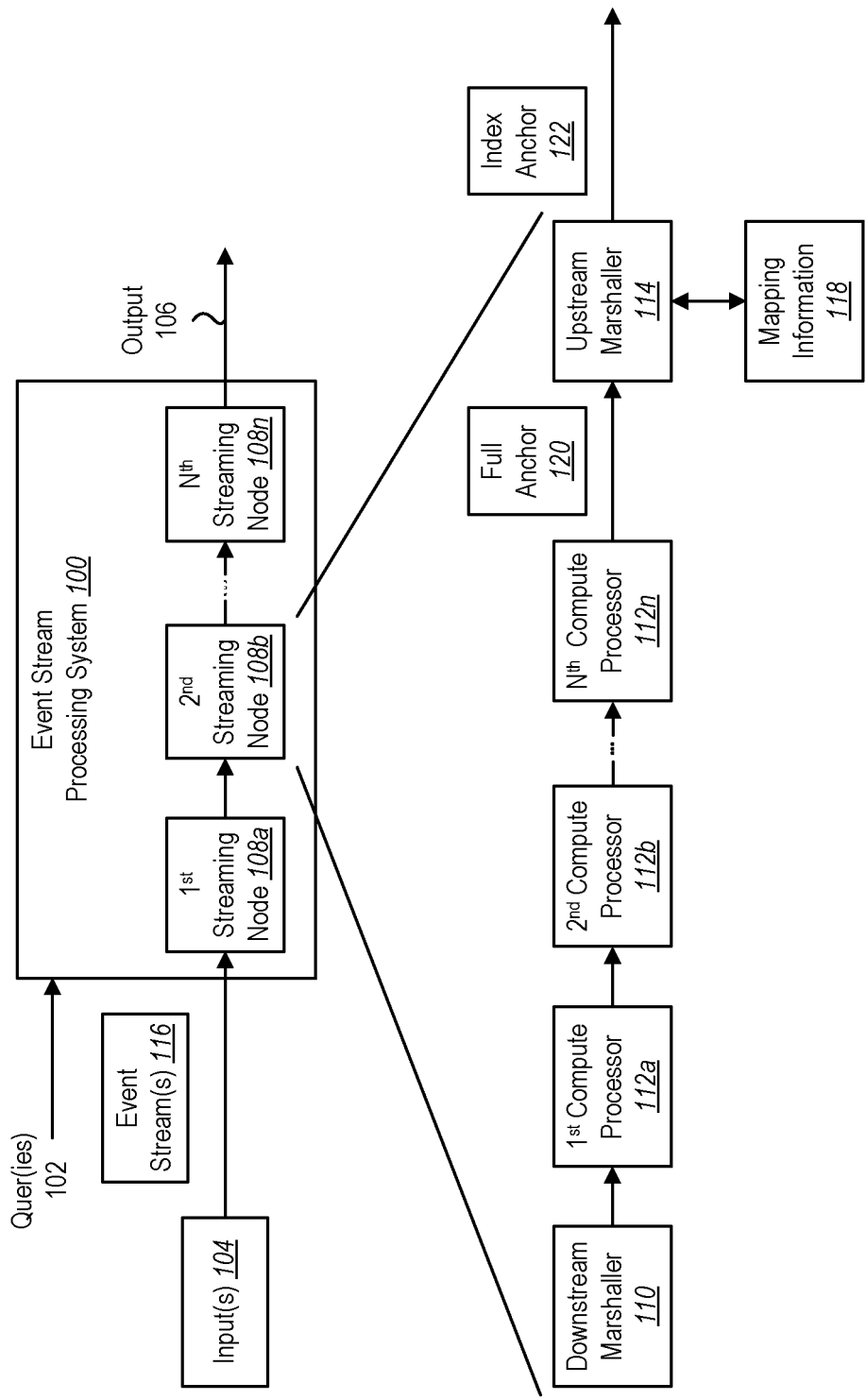
FIG. 1 illustrates an example of an event stream processing (ESP) system that is configured to facilitate anchor remapping across streaming nodes in accordance with the present disclosure.

From time to time, one or more nodes in an ESP system may fail. Some ESP systems may simply skip any data that was missed due to node failure. However, it may be desirable for the node(s) in an ESP system to be able to resume processing from the point at which failure occurred.

One technique to recover from node failure without loss or duplication of results relies on the formation of anchors. In this context, the term "node" may refer to a single computing device or to a set of computing devices that collectively function to perform one or more tasks. An ESP system may include multiple nodes. The term "anchor" refers to a logical pointer into an event stream that allows processing within an ESP system to resume from a precise point. A general methodology for constructing systems of anchors is described in U.S. patent application Ser. No. 14/732,416, titled "Using Anchors for Reliable Stream Processing," filed on Jun. 5, 2015, and assigned to the owner of the present application.

An anchor may take the form of metadata that is associated with a data batch. An anchor corresponding to a particular data batch may include an indication of a latest input point for every input that is used to generate the data batch. An anchor may also include some additional wrapping. In this context, the term "data batch" refers to a set of data that corresponds to one or more event streams. The term "input" refers to a source of an event stream (e.g., a sensor, a control system, a software application). The term "input point" refers to a particular point in one or more event streams corresponding to a data batch. An input point may be characterized in a variety of different ways. Some examples of input points include a file offset, a file identifier, and a time stamp.

As used herein, the terms "upstream" and "downstream" may be used to describe the flow of data in an ESP system. An ESP system may be configured so that a downstream entity pulls data from an upstream entity via a pull operation. As part of performing the pull operation, the downstream entity may reference a specific anchor corresponding to a particular data batch. The anchor indicates a point in the data that the response should come after.

More specifically, a downstream entity may send a request for a batch of data to an upstream entity. The request may reference a particular anchor. In response to the request, the upstream entity may return the requested batch of data, beginning at the point in the data corresponding to the specified anchor. The upstream entity may also return a new anchor. When the downstream entity makes a subsequent request for another batch of data from the upstream entity, the request may reference the new anchor.

Anchors may be nested, such that a particular anchor may include a reference to one or more other anchors. Consider a relatively simple example that involves three processing entities, which will be referred to as an input processor, a first compute processor, and a second compute processor. In this context, the term "input processor" refers to a processing entity that ingests one or more event streams from one or more inputs. The term "compute processor" refers to a processing entity that performs one or more processing operations on event stream(s).

Suppose that these processing entities are connected serially. Further suppose that the input processor ingests data from a data source, the first compute processor pulls data from the input processor, and the input processor returns anchor $a_1$ along with the requested data. Subsequently, when the second compute processor pulls data from the first compute processor, suppose that the first compute processor returns anchor $a_2$ along with the requested data. In this example, anchor $a_2$ may include a reference to anchor $a_1$. Thus, anchor $a_2$ may be considered to be a nested anchor. More generally, as used herein, the term "nested anchor" refers to an anchor that includes a reference to at least one other anchor.

The previous example was relatively simple and involved just three processing entities. However, the overall structure (or topology) of an ESP system may be fairly complex. For example, an ESP system may include multiple nodes, and these nodes may be interconnected in various ways. Moreover, a single node may include multiple processing entities, which may also be interconnected in various ways.

The size of an anchor may grow exponentially with the number of processing entities that it covers. Thus, in an ESP system that has a complex processing topology, the size of anchors can grow quickly. In the simple example discussed above, anchor $a_2$ was a function of just one other anchor, namely anchor $a_1$. But in an ESP system with a complex processing topology, an anchor could be a function of a very large number (e.g., thousands) of other anchors.

As anchors become larger and more complex, the value of using anchors may be diminished. At some point, the size of an anchor may become so large that problems may occur. For example, since ESP systems are memory intensive, the use of large anchors might exhaust the available supply of memory.

The present disclosure is generally related to facilitating anchor shortening across streaming nodes in an ESP system to support complex processing topologies. In accordance with the present disclosure, boundary entities may be provided within the nodes of an ESP system. These boundary entities may be referred to herein as "marshallers." Two different types of marshallers are described herein: downstream marshallers and upstream marshallers. In general terms, a marshaller is an entity that is configured to facilitate anchor mapping, as will be described in greater detail below. An upstream marshaller within a particular node may be configured to perform anchor mapping and remapping. A downstream marshaller within a particular node may pull data from an upstream marshaller in another node.

More specifically, when an upstream marshaller receives an anchor, the upstream marshaller may map the anchor to an index (e.g., a single numeric value). Instead of passing the anchor (which may be quite complex) to a downstream marshaller, the upstream marshaller may pass the index instead. This limits the complexity of anchors within an ESP system. The upstream marshaller may store mapping information, which may be any information that indicates the relationship between the anchor and the index. If the downstream node subsequently fails and the downstream marshaller requests a batch of data corresponding to the index, the upstream marshaller may use the mapping information to determine the original anchor.

FIG. 1 illustrates an example of an ESP system 100 that is configured to facilitate anchor shortening across streaming nodes 108a-n in accordance with the present disclosure. In response to one or more queries 102 (which may be provided as input from a user), the ESP system 100 may ingest one or more event streams 116 from one or more inputs 104, process the event stream(s) 116 in accordance with the quer(ies) 102, and generate output 106.

The ESP system 100 may include a plurality of streaming nodes 108a-n, including a first streaming node 108a, a second streaming node 108b, and an Nth streaming node 108n. Each of the streaming nodes 108a-n may be configured to perform one or more processing operations, and the streaming nodes 108a-n may be interconnected to implement the desired processing of the event stream(s) 116 ingested from the input(s) 104. For simplicity, the streaming nodes 108a-n are shown as being connected serially. However, the structure of the ESP system 100 shown in FIG. 1 is provided for purposes of example only, and should not be interpreted as limiting the scope of the techniques disclosed herein. More complex topologies are possible in accordance with the present disclosure.

FIG. 1 also shows some of the components that may be included in the second streaming node 108b, including a downstream marshaller 110, a plurality of compute processors 112a-n, and an upstream marshaller 114. The downstream marshaller 110 may be configured to pull data from an upstream marshaller (not shown) in the first streaming node 108a. The compute processors 112a-n may each be configured to perform one or more processing operations, and they may be interconnected in various ways to implement the desired processing of the event stream(s) 116. For simplicity, the compute processors 112a-n are shown as being connected serially. Again, however, more complex topologies are possible in accordance with the present disclosure.

The ESP system 100 may use anchors to facilitate recovery from node failure without loss or duplication of results. Anchors may be passed between various entities within the ESP system 100. For example, anchors may be passed between nodes (e.g., from the first streaming node 108a to the second streaming node 108b). Anchors may also be passed between compute processors within a single node (e.g., from the first compute processor 112a to the second compute processor 112b).

The size of an anchor may grow as it is passed along a chain of multiple processing entities, such as the chain of compute processors 112a-n. FIG. 1 shows an anchor 120 being passed from the Nth compute processor 112n to the upstream marshaller 114.

Because the anchor 120 may be generated at the end of a chain of compute processors 112a-n, the anchor 120 may be fairly large and complex. The upstream marshaller 114 may be configured to map the (potentially complex) anchor 120 that it receives to a simple index 122, such as a single numeric value. The anchor 120 that the upstream marshaller 114 receives from the Nth compute processor 112n may be referred to as a full anchor 120, and the index 122 to which the full anchor 120 is mapped may be referred to herein as an index anchor 122. As used herein, the term "full anchor" refers to a complete representation of an anchor that has been mapped to a simpler representation, such as an index. The term "index anchor" refers to an index to which a full anchor has been mapped. The upstream marshaller 114 may pass the index anchor 122 to a downstream marshaller in a downstream node, instead of passing the full anchor 120 itself. In this way, the complexity of anchors within the ESP system 100 may be limited.

The upstream marshaller 114 may store mapping information 118 indicating the relationship between the full anchor 120 and the index anchor 122. If the upstream marshaller 114 subsequently receives a data request that references the index anchor 122 (in the event that a downstream node fails, for example), the upstream marshaller 114 may use the mapping information 118 to identify the full anchor 120 that corresponds to the index anchor 122.

Figure 2A:
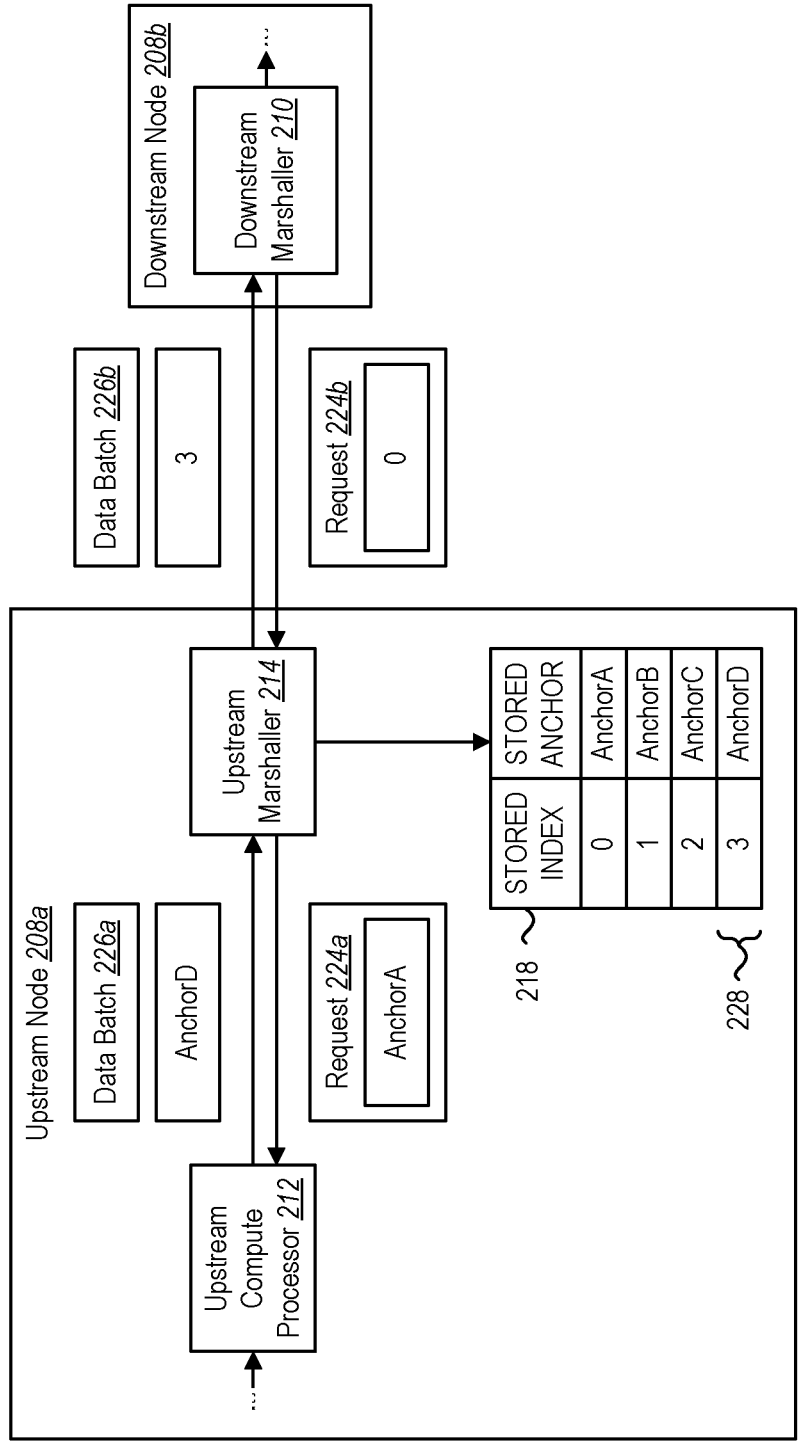
FIG. 2A illustrates an example showing how an upstream marshaller within an ESP system may map a full anchor to an index anchor.
Figure 2B:
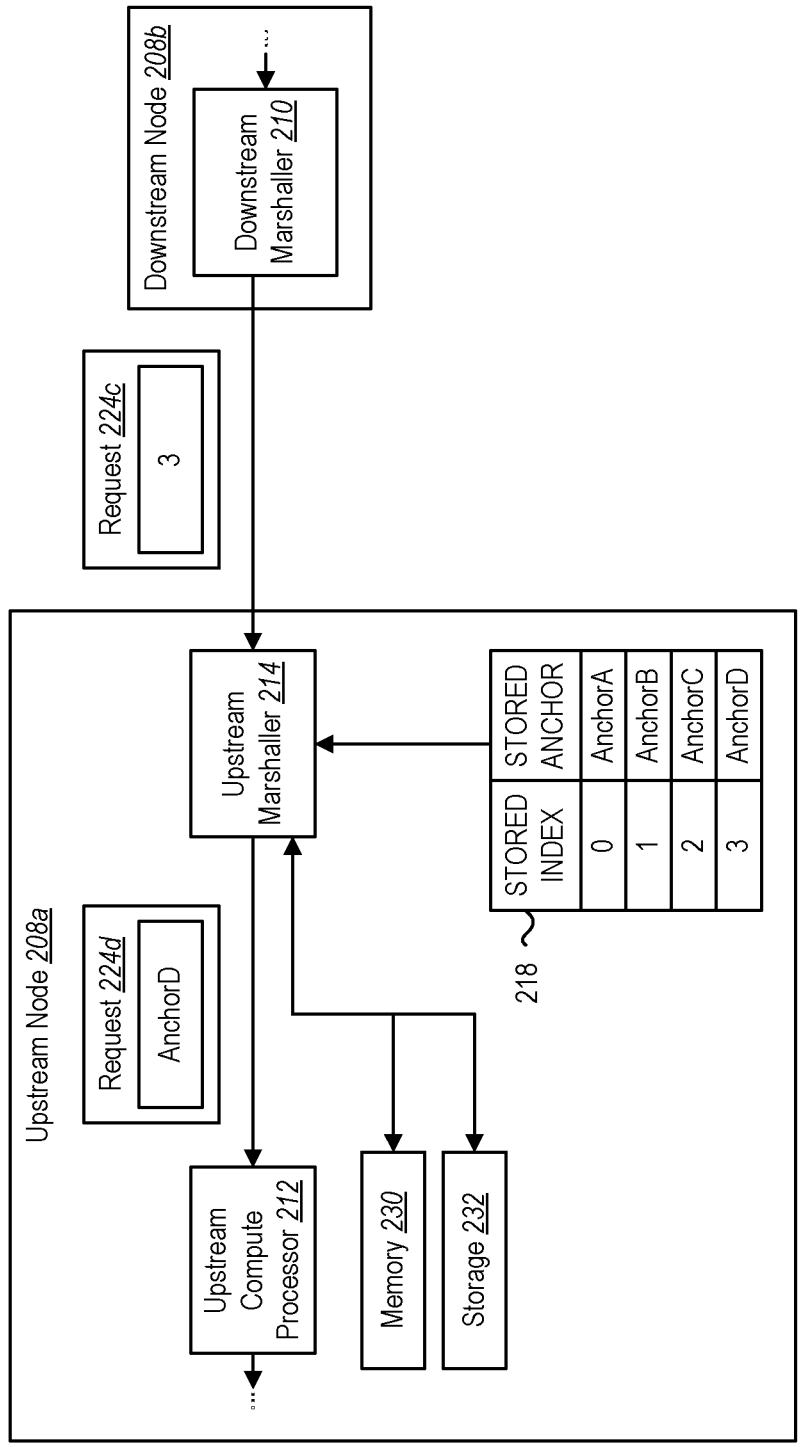
FIG. 2B illustrates an example showing how the upstream marshaller may remap the index anchor back to the full anchor.

An example will be discussed in relation to FIGS. 2A-B. Reference is initially made to FIG. 2A, which illustrates how an upstream marshaller 214 within an ESP system 200 may map a full anchor to an index anchor. The ESP system 200 may be configured so that downstream entities pull data from upstream entities. For example, the upstream marshaller 214 may be configured to pull a data batch 226a from an upstream compute processor 212 by sending a request 224a for the data batch 226a to the upstream compute processor 212. (In this context, the term "upstream compute processor" refers to a compute processor that is upstream from another processing entity. In FIGS. 2A-B, the upstream compute processor 212 is upstream from the upstream marshaller 214.) The request 224a may reference a particular anchor (e.g., AnchorA), which may indicate a point in one or more event streams 116 where the data batch 226a should begin.

In response to the request 224a, the upstream compute processor 212 may provide the requested data batch 226a. In addition to providing the requested data batch 226a, the upstream compute processor 212 may also provide the upstream marshaller 214 with a new anchor (e.g., AnchorD). The new anchor may indicate one or more end points corresponding to the data batch 226a. When the upstream marshaller 214 makes a subsequent request (not shown) for data from the upstream compute processor 212, the subsequent request may reference this new anchor (AnchorD) to indicate where the newly requested data should begin.

The upstream compute processor 212 may be at the end of a long chain of processing entities (such as the chain of compute processors 112a-n shown in FIG. 1), and as a result AnchorD may be fairly complex. For example, AnchorD may be a nested anchor that includes a reference to one or more other anchors. To simplify downstream processing, the upstream marshaller 214 may map AnchorD to a simple index, which may be a single numeric value (e.g., 3). The upstream marshaller 214 may also store mapping information indicating the relationship between AnchorD and the corresponding index anchor in a table 218. The table 218 may include multiple records 228. Each record 228 may include a stored index anchor (e.g., 3) and a corresponding stored full anchor (e.g., AnchorD).

An anchor protocol may be designed so that different anchors created by the same processing entity may be compared in order to determine their relative order. For instance, different anchors created by the upstream compute processor 212 (e.g., AnchorA and AnchorD) may be compared to determine which has a greater value. As a result of this comparison, a determination may be made about the relative order of the anchors being compared. For example, a determination may be made that AnchorD has a greater value than AnchorA. This may indicate that the point in the event stream(s) 116 corresponding to AnchorD occurs after the point in the event stream(s) 116 corresponding to AnchorA.

The ESP system 200 may be configured so that when an upstream marshaller 214 creates index anchors, the ability to compare different full anchors is preserved. In other words, the ESP system 200 may be configured so that the value of a first index anchor is greater than the value of a second index anchor if and only if the value of the full anchor corresponding to the first index anchor is greater than the value of the full anchor corresponding to the second index anchor. Thus, the properties of full anchors that permit the full anchors to be compared with one another may be preserved in the index anchors that are created.

To preserve the ability to compare different anchors, the upstream marshaller 214 may be configured to create new index anchors in sequential order. Referring again to the example depicted in FIG. 2A, suppose that AnchorB has a greater value than AnchorA, AnchorC has a greater value than AnchorB, and so forth. By creating new index anchors in sequential order, the index anchors preserve the relative values of the full anchors. In other words, the index anchor corresponding to AnchorB (which is 1) has a greater value than the index anchor corresponding to AnchorA (which is 0). Similarly, the index anchor corresponding to AnchorC (which is 2) has a greater value than the index anchor corresponding to AnchorB (which is 1), and so forth.

An ESP system in accordance with the present disclosure may be configured so that the ability to compare anchors is preserved even if anchor mapping is performed multiple times. For example, referring briefly to the ESP system 100 shown in FIG. 1, suppose that upstream marshallers in multiple streaming nodes 108a-n perform anchor mapping as disclosed herein (e.g., the index anchor 122 created by the upstream marshaller 114 is passed to a subsequent streaming node and additional mapping is performed by a subsequent upstream marshaller). In accordance with the present disclosure, the ability to compare anchors may be preserved even in this type of scenario. Thus, an ESP system may be configured so that anchor mapping as disclosed herein does not affect the ability to compare anchors.

Referring again to the example shown in FIG. 2A, in order to determine the index anchor to which AnchorD should be mapped, the upstream marshaller 214 may determine the index anchor that was issued most recently. This information may be determined from the table 218. Then, the upstream marshaller 214 may increment the value of the most recently issued index anchor. In the depicted example, it will be assumed that the most recently issued index anchor is the number 2. Thus, in this example the upstream marshaller 214 may determine the index anchor to which AnchorD should be mapped by incrementing the number 2, thereby obtaining the number 3.

At some subsequent point in time, a downstream marshaller 210 in a downstream node 208b may pull a data batch 226b from the upstream marshaller 214 by sending a request 224b to the upstream marshaller 214. The request 224b may reference a particular index anchor (e.g., 0), which may indicate a point in one or more event streams 116 where the data batch 226b should begin.

In response to the request 224b, the upstream marshaller 214 may provide the requested data batch 226b along with a new index anchor (e.g., 3). The new index anchor may correspond to the most recent full anchor (AnchorD) that the upstream marshaller 214 has received from the upstream compute processor 212. However, instead of providing the full anchor (AnchorD) along with the requested data batch 226b, the upstream marshaller 214 may instead provide the index anchor (3) to which the full anchor has been mapped. In other words, the upstream marshaller 214 may pass the index anchor as a new anchor to the downstream marshaller 210.

Reference is now made to FIG. 2B, which illustrates how the upstream marshaller 214 may remap the index anchor (3) back to the full anchor (AnchorD) under some circumstances. If, for example, the downstream node 208b (or another node that is farther downstream) fails, the downstream marshaller 210 may send a request 224c for the upstream marshaller 214 to resend data that the upstream marshaller 214 previously sent. The request 224c may include a reference to the index anchor (3) indicating the point in one or more event streams 116 where the upstream marshaller 214 should begin resending the data.

In response to receiving the request 224c, the upstream marshaller 214 may use the mapping information that is stored in the table 218 to determine the full anchor (AnchorD) that corresponds to the index anchor (3) in the request 224c. The upstream marshaller 214 may then pass the full anchor (AnchorD) to the upstream compute processor 212 by including the full anchor in a request 224d that the upstream marshaller 214 sends to the upstream compute processor 212.

In some implementations, the upstream marshaller 214 may be configured so that it determines whether the data requested by the downstream marshaller 210 is stored locally before requesting the data from the upstream compute processor 212. For example, the upstream marshaller 214 may determine whether the requested data is stored in local memory 230. If the requested data is not stored in local memory 230, the upstream marshaller 214 may determine whether the requested data is stored in local storage 232. If the requested data is not stored in local storage 232, the upstream marshaller 214 may send the request 224d for the data to the upstream compute processor 212. Thus, the upstream marshaller 214 may be configured so that it passes the full anchor (AnchorD) to the upstream compute processor 212 in response to determining that the data requested by the downstream marshaller 210 is not stored locally.

The local memory 230 and the local storage 232 may be part of the upstream node 208a. For example, the upstream node 208a may be a computing device, and the local memory 230 and the local storage 232 may be part of that computing device. In other words, it may not be necessary to use a network interface to access the local memory 230 and the local storage 232.

Figure 3:
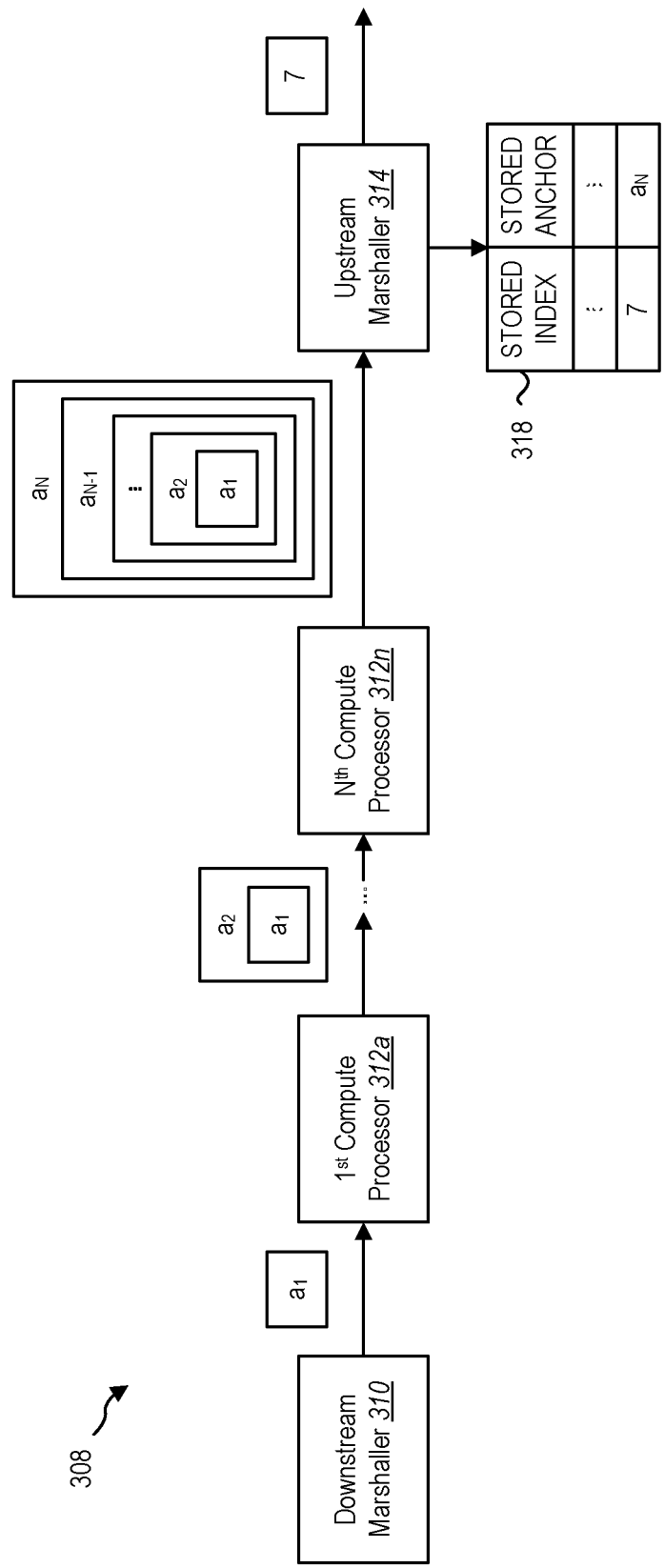
FIG. 3 illustrates an example showing how the mapping techniques disclosed herein may limit the complexity of anchors within an ESP system.

FIG. 3 illustrates how the mapping techniques disclosed herein may limit the complexity of anchors within an ESP system. Anchors $a_1$ through $a_N$ are shown growing in complexity as they move down a chain of compute processors 312a-n in a streaming node 308. An upstream marshaller 314 may then map the full anchor $a_N$ (which is a nested anchor that includes references to anchors $a_1 \ldots a_{N-1}$) to a simple index anchor such as a single numeric value (e.g., 7).

More specifically, a downstream marshaller 310 within the streaming node 308 may pull data from an upstream node (not shown). When the first compute processor 312a pulls the data from the downstream marshaller 310, the downstream marshaller 310 may provide an anchor $a_1$ to the first compute processor 312a. When a second compute processor (not shown) pulls data from the first compute processor 312a, the first compute processor 312a may provide an anchor $a_2$ to the second compute processor. The anchor $a_2$ may include a reference to the anchor $a_1$ that the first compute processor 312a received from the downstream marshaller 310.

This pattern of creating a new anchor that references the previously received anchor(s) may continue, such that the anchors grow in complexity as they move down the chain of compute processors 312a-n. FIG. 3 shows the Nth compute processor 312n providing an anchor $a_N$ to the upstream marshaller 314. Anchor $a_N$ includes a reference to anchors $a_1$ through $a_{N-1}$.

To simplify downstream processing, the upstream marshaller 314 may map the full anchor $a_N$ to a simple index anchor, which may be a single numeric value (e.g., 7). The upstream marshaller 314 may also store mapping information in a table 318 indicating the relationship between the full anchor $a_N$ and the corresponding index anchor.

Figure 4:
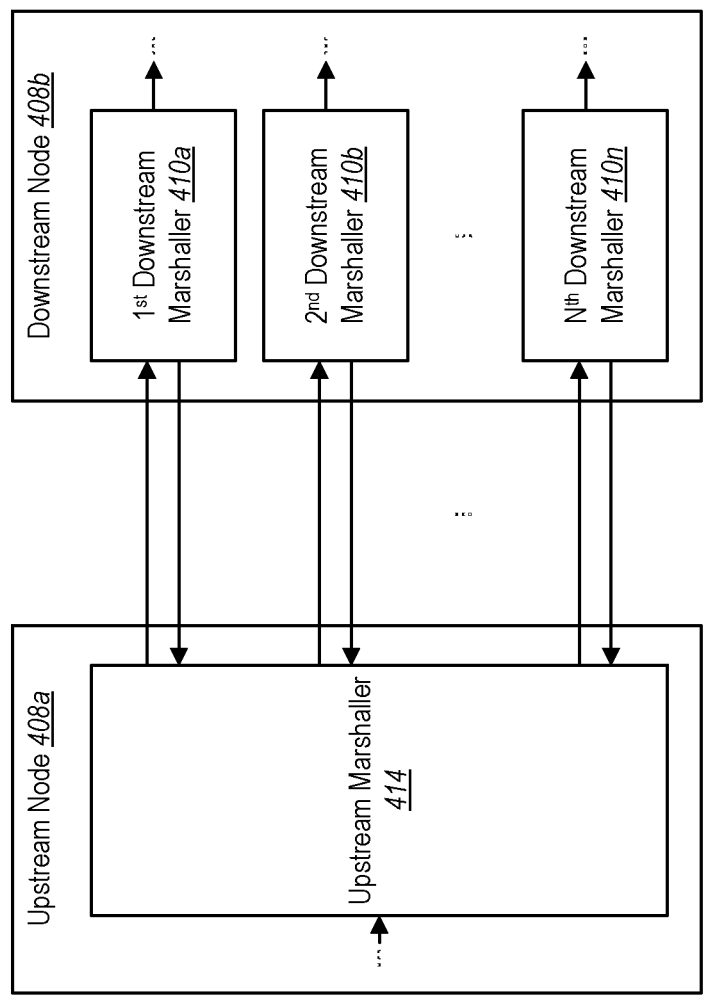
FIG. 4 illustrates aspects of an ESP system in which an upstream marshaller is connected to multiple downstream marshallers.
Figure 5:
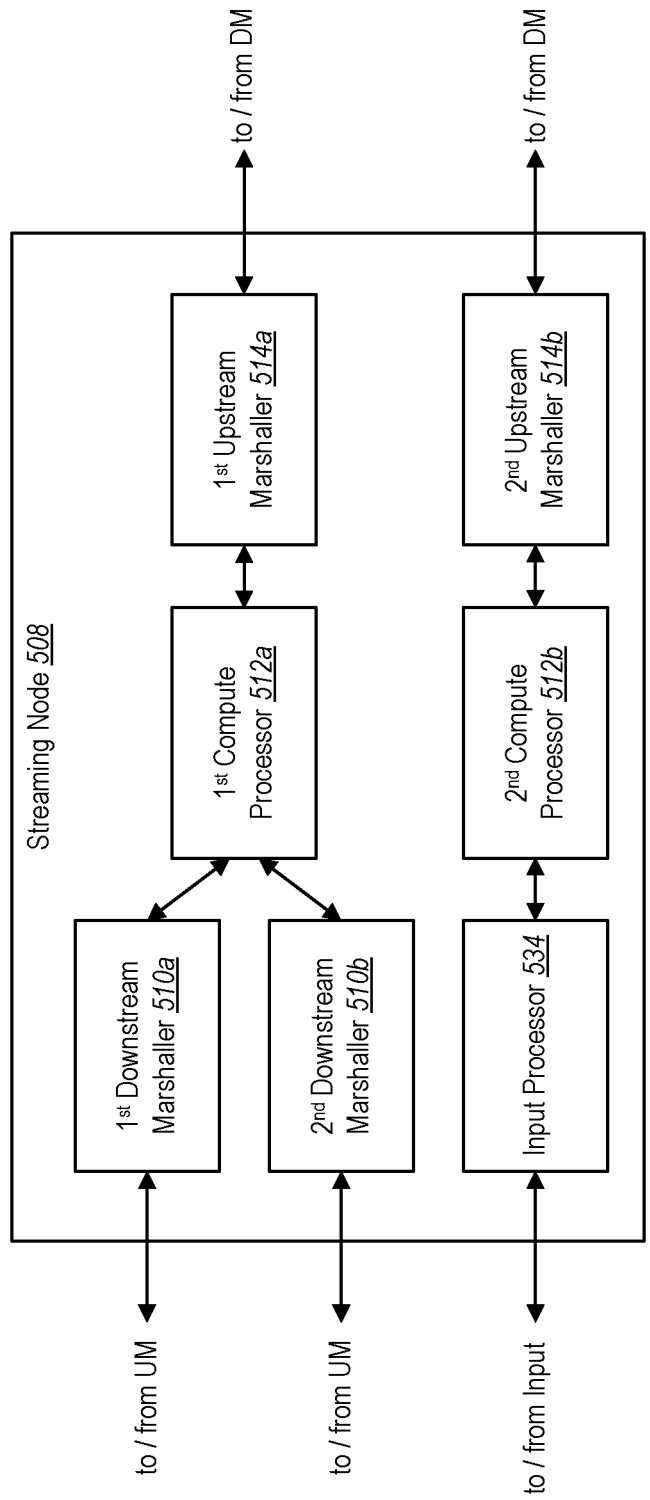
FIG. 5 illustrates an example of a streaming node that includes multiple downstream marshallers, compute processors, and upstream marshallers.

Although the examples of ESP systems discussed above have been fairly simple, more complex topologies are possible. FIGS. 4 and 5 show some additional aspects of topologies that may be utilized by an ESP system.

FIG. 4 shows an upstream marshaller 414 connected to multiple downstream marshallers 410a-n. Each of the downstream marshallers 410a-n may be configured to pull data from the upstream marshaller 414. When the downstream marshallers 410a-n request data from the upstream marshaller 414, the upstream marshaller 414 may provide an index anchor corresponding to a more complex full anchor, in the manner discussed above.

FIG. 4 shows the upstream marshaller 414 on an upstream node 408a and the downstream marshallers 410a-n on a single downstream node 408b. Alternatively, the downstream marshallers 410a-n may be implemented on different nodes.

FIG. 5 shows a streaming node 508 that includes multiple downstream marshallers 510a-b, compute processors 512a-b, and upstream marshallers 514a-b. The streaming node 508 also includes an input processor 534.

The downstream marshallers 510a-b may be configured to pull data from an upstream marshaller in an upstream node (not shown). The first compute processor 512a may be configured to pull data from the downstream marshallers 510a-b. The first upstream marshaller 514a may be configured to pull data from a first compute processor 512a. A downstream marshaller in a downstream node (not shown) may be configured to pull data from the first upstream marshaller 514a.

The input processor 534 may be configured to pull data from an input (not shown). The second compute processor 512b may be configured to pull data from the input processor 534. The second upstream marshaller 514b may be configured to pull data from the second compute processor 512b.

When data is passed from one entity to another, an anchor may be provided. Each of the upstream marshallers 514a-b may be configured to map a full anchor to an index anchor, in the manner discussed above.

Figure 6:
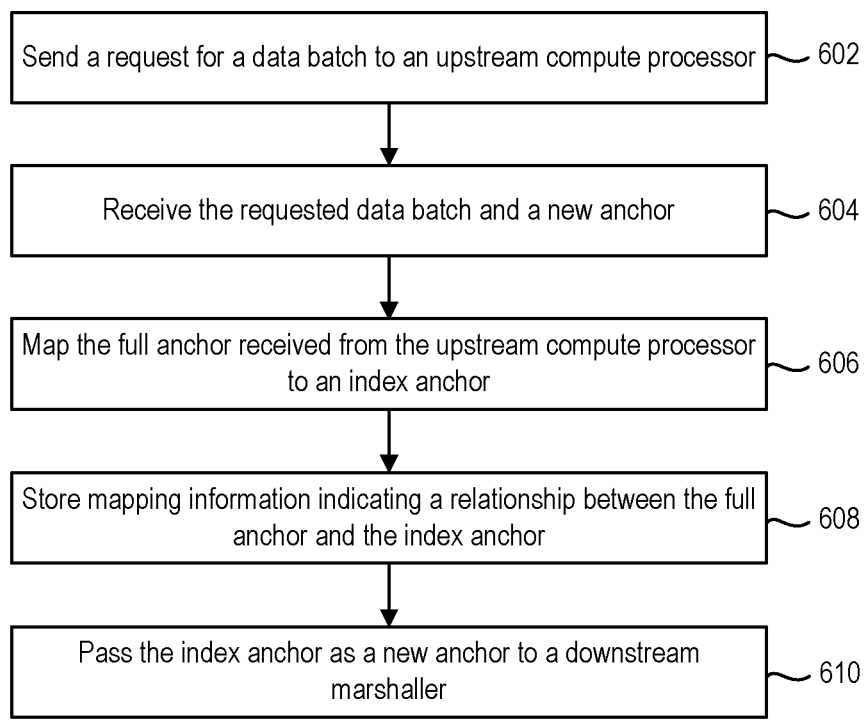
FIG. 6 illustrates an example of a method for facilitating anchor shortening across streaming nodes.

FIG. 6 illustrates an example of a method 600 for facilitating anchor shortening across streaming nodes in an ESP system. The method 600 will be described in relation to the ESP system 200 shown in FIGS. 2A-B. The method 600 may be implemented by an upstream marshaller 214 within the ESP system 200.

The method 600 may include sending 602 a request 224a for a data batch 226a to an upstream compute processor 212. The request 224a may include a reference to a particular anchor that indicates the point in one or more event streams 116 where the requested data batch 226a should begin. In response to the request 224a, the upstream marshaller 214 may receive 604 the requested data batch 226a along with a new anchor.

To simplify downstream processing, the upstream marshaller 214 may map 606 the full anchor received from the upstream compute processor 212 to an index anchor, which may be a single numeric value. The upstream marshaller 214 may also store 608 mapping information indicating the relationship between the full anchor and the index anchor. The mapping information may be stored 608 in a table 218, for example. At some subsequent point in time, the upstream marshaller 214 may pass 610 the index anchor as a new anchor to a downstream entity, such as a downstream marshaller 210. For example, when a downstream marshaller 210 sends a request 224b to the upstream marshaller 214 for a data batch 226*b*, the upstream marshaller 214 may provide the requested data batch 226*b* along with the index anchor.

Figure 7:
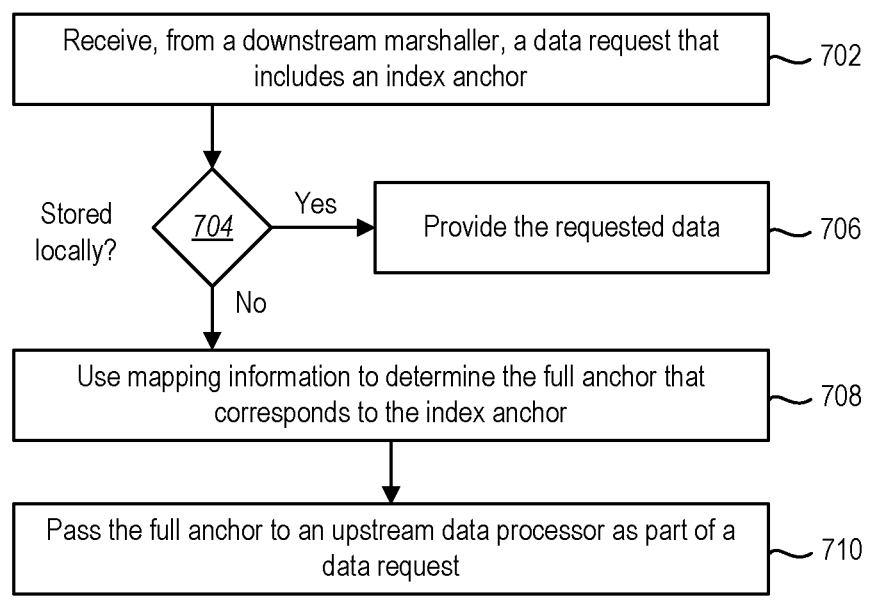
FIG. 7 illustrates an example of a method for remapping in an ESP system that implements an anchor protocol, the method being performed to recover from failure of a downstream node.

FIG. 7 illustrates an example of a method 700 for remapping in an ESP system that implements an anchor protocol. The method 700 will be described in relation to the ESP system 200 shown in FIGS. 2A-B. The method 700 may be implemented by an upstream marshaller 214 within the ESP system 200.

The upstream marshaller 214 may receive 702, from a downstream entity such as a downstream marshaller 210, a request 224*c* to resend data that the upstream marshaller 214 previously sent. The downstream marshaller 210 may send such a request 224*c* in response to failure of a downstream node (such as the downstream node 208*b* that includes the downstream marshaller 210, or another node that is farther downstream). The request 224*c* may include a reference to an index anchor that the upstream marshaller 214 previously provided to the downstream marshaller 210.

In response to receiving 702 the request 224*c*, the upstream marshaller 214 may determine 704 whether the requested data is stored locally. If it is, the upstream marshaller 214 may provide 706 the requested data.

If, however, the requested data is not stored locally, the upstream marshaller 214 may use mapping information to determine 708 the full anchor that corresponds to the index anchor in the request 224*c*. In other words, the upstream marshaller 214 may remap the index anchor to the full anchor. The upstream marshaller 214 may then pass 710 the full anchor to the upstream compute processor 212 by including the full anchor in a request 224*d* that the upstream marshaller 214 sends to the upstream compute processor 212.

Figure 8:
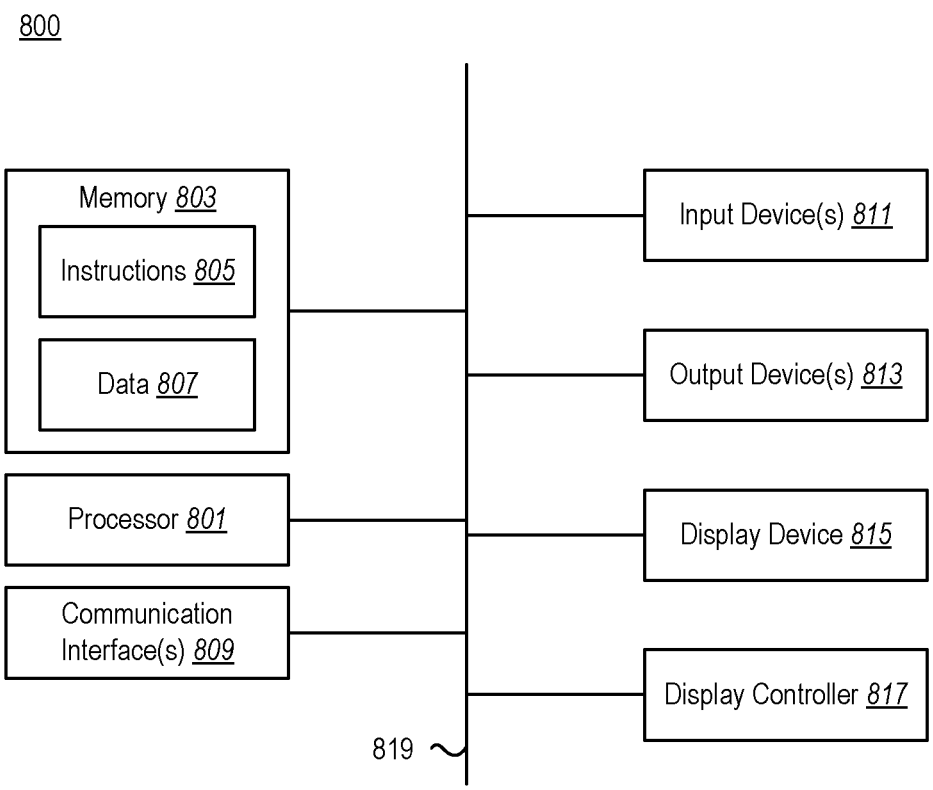
FIG. 8 illustrates certain components that may be included within a computer system.

FIG. 8 illustrates certain components that may be included within a computer system 800. One or more computer systems 800 may be used to implement the various devices, components, and systems described herein, including the ESP systems 100, 200 and the streaming nodes 108*a-n*, 208*a-b*, 308, 408, 508.

The computer system 800 includes a processor 801. The processor 801 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the methods disclosed herein, such as the methods 600, 700 shown in FIGS. 6 and 7. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

In accordance with an aspect of the present disclosure, a method is disclosed for facilitating anchor shortening across streaming nodes in an event stream processing system. The method may include receiving a full anchor at an upstream marshaller. The full anchor may be associated with a data batch that corresponds to one or more event streams. The full anchor may include an indication of an input point for the one or more event streams. The full anchor may be received from an upstream compute processor. The method may also include mapping the full anchor to an index anchor and passing the index anchor to a downstream marshaller.

The full anchor may be a nested anchor that includes a reference to at least one other anchor.

The method may further include creating index anchors in sequential order, such that properties of full anchors that permit the full anchors to be compared with one another are preserved in the index anchors.

The method may further include storing mapping information indicating a relationship between the full anchor and the index anchor. The mapping information may be stored in a table having a plurality of records. Each record may include a stored index anchor and a corresponding stored full anchor.

The full anchor may be received at the upstream marshaller in response to a data request from the upstream marshaller. The method may further include receiving a requested data batch at the upstream marshaller.

The index anchor may be passed to the downstream marshaller in response to a data request from the downstream marshaller. The method may further include sending requested data to the downstream marshaller with the index anchor.

An upstream node may include the upstream marshaller. A downstream node may include the downstream marshaller. The upstream node and the downstream node may include separate computing devices.

In accordance with another aspect of the present disclosure, a method is disclosed for remapping in an event stream processing system that implements an anchor protocol. The method may include receiving an index anchor at an upstream marshaller. The index anchor may be received from a downstream marshaller. The index anchor may correspond to a full anchor that the upstream marshaller previously received from an upstream compute processor. The full anchor may be associated with a data batch that corresponds to one or more event streams. The full anchor may include an indication of an input point for the one or more event streams. The method may include using mapping information to determine the full anchor that corresponds to the index anchor, and passing the full anchor to the upstream compute processor.

The index anchor may be received in response to failure of a downstream node.

The full anchor may be a nested anchor that includes a reference to at least one other anchor.

The index anchor may be received at the upstream marshaller with a data request. The method may further include determining whether a requested data batch is stored locally. The full anchor may be passed to the upstream compute processor in response to determining that the requested data batch is not stored locally.

An upstream node may include the upstream marshaller. A downstream node may include the downstream marshaller. The upstream node and the downstream node may include separate computing devices.

In accordance with another aspect of the present disclosure, an event stream processing system may be configured to facilitate anchor shortening across streaming nodes. The event stream processing system may include a downstream marshaller, an upstream compute processor, and an upstream marshaller that is configured to receive a full anchor from the upstream compute processor. The full anchor may be associated with a data batch that corresponds to one or more event streams. The full anchor may include an indication of an input point for the one or more event streams. The upstream marshaller may be additionally configured to map the full anchor to an index anchor and pass the index anchor to the downstream marshaller.

The full anchor may be a nested anchor that includes a reference to at least one other anchor.

The upstream marshaller may be additionally configured to receive the index anchor from the downstream marshaller, use mapping information to determine the full anchor that corresponds to the index anchor, and pass the full anchor to the upstream compute processor.

The upstream marshaller may receive the index anchor with a data request. The upstream marshaller may be additionally configured to determine whether a requested data batch is stored locally. The upstream marshaller may pass the full anchor to the upstream compute processor in response to determining that the requested data batch is not stored locally.

The upstream marshaller may be configured to create index anchors in sequential order, such that properties of full anchors that permit the full anchors to be compared with one another are preserved in the index anchors.

The upstream marshaller may be additionally configured to store mapping information indicating a relationship between the full anchor and the index anchor.

The upstream marshaller may receive the full anchor from the upstream compute processor in response to a data request from the upstream marshaller. The upstream marshaller may be additionally configured to receive a requested data batch with the full anchor.

The upstream marshaller may pass the index anchor to the downstream marshaller in response to a data request from the downstream marshaller. The upstream marshaller may be additionally configured to send requested data to the downstream marshaller with the index anchor.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for facilitating anchor shortening across streaming nodes in an event stream processing system, comprising:
   receiving a full anchor at an upstream marshaller, the full anchor being associated with a data batch that corresponds to one or more event streams, the one or more event streams comprising an ordered sequence of multiple data events, the full anchor comprising an indication of an input point in the one or more event streams corresponding to the data batch, the full anchor being received from an upstream compute processor;
   mapping the full anchor to an index anchor; and
   passing the index anchor to a downstream marshaller.

2. The method of claim 1, wherein the full anchor is a nested anchor that comprises a reference to at least one other anchor.

3. The method of claim 1, further comprising creating index anchors in sequential order, such that properties of full anchors that permit the full anchors to be compared with one another are preserved in the index anchors.

4. The method of claim 1, further comprising storing mapping information indicating a relationship between the full anchor and the index anchor, the mapping information being stored in a table having a plurality of records, each record comprising a stored index anchor and a corresponding stored full anchor.

5. The method of claim 1, wherein:
   the full anchor is received at the upstream marshaller in response to a data request from the upstream marshaller; and
   the method further comprises receiving a requested data batch at the upstream marshaller.

6. The method of claim 1, wherein:
   the index anchor is passed to the downstream marshaller in response to a data request from the downstream marshaller; and
   the method further comprises sending requested data to the downstream marshaller with the index anchor.

7. The method of claim 1, wherein:
   an upstream node comprises the upstream marshaller;
   a downstream node comprises the downstream marshaller; and
   the upstream node and the downstream node comprise separate computing devices.

8. A method for remapping in an event stream processing system that implements an anchor protocol, comprising:
   receiving an index anchor at an upstream marshaller, the index anchor being received from a downstream marshaller, the index anchor corresponding to a full anchor that the upstream marshaller previously received from an upstream compute processor, the full anchor being associated with a data batch that corresponds to one or more event streams, the one or more event streams comprising an ordered sequence of multiple data events, the full anchor comprising an indication of an input point in the one or more event streams corresponding to the data batch, wherein the full anchor comprises a reference to at least one other anchor and the index anchor does not comprise the reference;
   using mapping information to determine the full anchor that corresponds to the index anchor; and
   passing the full anchor to the upstream compute processor.

9. The method of claim 8, wherein the index anchor is received in response to failure of a downstream node.

10. The method of claim 8, wherein the full anchor is a nested anchor that comprises a reference to at least one other anchor.

11. The method of claim 8, wherein:
    the index anchor is received at the upstream marshaller with a data request;
    the method further comprises determining whether a requested data batch is stored locally; and
    the full anchor is passed to the upstream compute processor in response to determining that the requested data batch is not stored locally.

12. The method of claim 8, wherein:
    an upstream node comprises the upstream marshaller;
    a downstream node comprises the downstream marshaller; and
    the upstream node and the downstream node comprise separate computing devices.

13. An event stream processing system configured to facilitate anchor shortening across streaming nodes, comprising:
    one or more processors;
    memory in electronic communication with the one or more processors; and
    instructions stored in memory, the instructions being executable by the one or more processors to:
       receive, at an upstream marshaller, a full anchor from an upstream compute processor, the full anchor being associated with a data batch that corresponds to one or more event streams, the one or more event streams comprising an ordered sequence of multiple data events, the full anchor comprising an indication of an input point in the one or more event streams corresponding to the data batch;
       map, at the upstream marshaller, the full anchor to an index anchor, wherein comparing the index anchor with one or more index anchors associated with one or more full anchors indicates a relative order of the full anchor as compared to the one or more full anchors; and
       pass, by the upstream marshaller, the index anchor to a downstream marshaller.

14. The event stream processing system of claim 13, wherein the full anchor is a nested anchor that comprises a reference to at least one other anchor.

15. The event stream processing system of claim 13, wherein the instructions are further executable by the one or more processors to:
    receive, at the upstream marshaller, the index anchor from the downstream marshaller;
    use mapping information to determine the full anchor that corresponds to the index anchor; and
    pass the full anchor to the upstream compute processor.

16. The event stream processing system of claim 15, wherein:
    receiving, at the upstream marshaller, the index anchor comprises receiving the index anchor with a data request;
    the instructions are further executable by the one or more processors to determine whether a requested data batch is stored locally; and
    pass the full anchor to the upstream compute processor in response to determining that the requested data batch is not stored locally.

17. The event stream processing system of claim 13, wherein the instructions are further executable by the one or more processors to create index anchors in sequential order, such that properties of full anchors that permit the full anchors to be compared with one another are preserved in the index anchors.

18. The event stream processing system of claim 13, wherein the instructions are further executable by the one or more processors to store mapping information indicating a relationship between the full anchor and the index anchor.

19. The event stream processing system of claim 13, wherein:
- receiving, at the upstream marshaller, a full anchor from the upstream compute processor is in response to a data request from the upstream marshaller; and
- wherein the instructions are further executable by the one or more processors to receive a requested data batch with the full anchor.

20. The event stream processing system of claim 13, wherein:
- passing, by the upstream marshaller, the index anchor to the downstream marshaller is in response to a data request from the downstream marshaller; and
- wherein the instructions are further executable by the one or more processors to send, by the upstream marshaller, requested data to the downstream marshaller with the index anchor.

* * * * *